(12) United States Patent
Snyder

(10) Patent No.: US 10,889,249 B1
(45) Date of Patent: Jan. 12, 2021

(54) UTILITY HOOK ASSEMBLY WITH HIDDEN MAGNETIC LATCH

(71) Applicant: Robert Snyder, Beaumont, CA (US)

(72) Inventor: Robert Snyder, Beaumont, CA (US)

( * ) Notice: Subject to any disclaimer, the term of this patent is extended or adjusted under 35 U.S.C. 154(b) by 0 days.

(21) Appl. No.: 16/998,994

(22) Filed: Aug. 20, 2020

(51) Int. Cl.
 *B60R 7/08* (2006.01)
 *A47F 5/00* (2006.01)
 *A47F 7/00* (2006.01)
 *B60R 11/00* (2006.01)

(52) U.S. Cl.
 CPC ............ *B60R 7/08* (2013.01); *A47F 5/0006* (2013.01); *A47F 7/0071* (2013.01); *B60R 2011/0052* (2013.01); *B60R 2011/0057* (2013.01); *B60R 2011/0071* (2013.01)

(58) Field of Classification Search
 CPC ............ B60R 7/08; B60R 2011/0057; B60R 2011/0052; B60R 2011/0071; A47F 7/0071; A47F 7/0078; A47F 5/0006
 See application file for complete search history.

(56) References Cited

U.S. PATENT DOCUMENTS

| | | | | |
|---|---|---|---|---|
| 254,692 A * | 3/1882 | Rath | ...................... | A47L 13/512 248/113 |
| 1,505,539 A * | 8/1924 | Burke | ................... | A47F 7/0071 248/127 |
| 1,897,266 A * | 2/1933 | Mcgeoch | ............... | A47K 10/22 242/596.1 |
| 2,038,903 A * | 4/1936 | Rakatzky | ............... | A47F 7/0071 211/96 |
| 2,051,408 A * | 8/1936 | Karst | ..................... | A47F 5/0876 211/65 |
| 2,467,825 A * | 4/1949 | Hall | ........................ | A47K 10/22 242/596.1 |
| 2,911,172 A * | 11/1959 | Clayton | ................. | A47L 13/512 248/113 |
| 4,312,455 A * | 1/1982 | Weber | ................... | A47G 29/083 211/119.005 |
| 4,616,753 A * | 10/1986 | Aslan | .................... | A47F 5/0807 211/57.1 |
| 4,858,840 A * | 8/1989 | Kidman | .................. | A47K 10/38 242/596.3 |
| 4,909,467 A * | 3/1990 | Shan-Pao | ........... | A47G 23/0241 211/75 |

(Continued)

Primary Examiner — Ko H Chan
(74) Attorney, Agent, or Firm — Fulwider Patton LLP

(57) ABSTRACT

A utility hook assembly is disclosed that conveniently secures to a planar surface such as the bottom of a counter or cabinet, and has a plurality of hooks that extend perpendicular to a mounting base. The base includes on an outer surface a fixed bracket with a pair of eyelets that are collinear at an edge of the mounting bracket. The eyelets each receive one end of a suspended hook member such that the suspended hook members can swing/pivot about their respective eyelet in separate but parallel vertical planes. The opposite ends of the hook members are collinear and laterally extended in opposite directions. Disposed on an inner surface of the base is one or more magnets positioned above the intersection of the opposite ends of the hook members and the base when the hook members are fully rotated parallel to the base. The magnets allow the hooks to attach to the base without any other mechanical attachments, providing a simple and reliable attachment mode for the utility hooks.

7 Claims, 4 Drawing Sheets

(56) References Cited

U.S. PATENT DOCUMENTS

| | | | | |
|---|---|---|---|---|
| D354,429 S * | 1/1995 | McNaughton | ............... | D8/367 |
| 6,416,026 B1 * | 7/2002 | Porraro | ............... | A47F 7/0078 |
| | | | | 248/309.1 |
| 6,786,377 B1 * | 9/2004 | Holden | ............... | B65H 35/10 |
| | | | | 225/106 |
| 7,131,616 B2 * | 11/2006 | Livingstone | ....... | A47G 25/0642 |
| | | | | 248/304 |
| 7,219,868 B2 * | 5/2007 | Marler | ............... | A47G 29/083 |
| | | | | 16/256 |
| 7,669,822 B2 * | 3/2010 | Kluge | ............... | F16B 45/02 |
| | | | | 248/308 |
| 9,480,366 B2 * | 11/2016 | Ljung | ............... | A47J 47/16 |
| 10,544,897 B2 * | 1/2020 | Nesin | ............... | B62H 3/12 |

\* cited by examiner

UTILITY HOOK ASSEMBLY WITH HIDDEN MAGNETIC LATCH

BACKGROUND

The present invention relates generally to utility hooks, and more particularly to a utility hook assembly that mounts to a horizontal surface so that one or more hooks can be suspended therefrom and conveniently stored with a hidden magnet.

Utility hooks are well known in the art. Wallboard may include holes that receive hooks for hanging items, and there are many other examples of hooks used in kitchens, work areas, closets, etc, where space is at a premium. While hooks can be hung from a wall or a ceiling, it is desirable to have the hooks out of sight when not in use to present a more uncluttered space. There are few good options for having a hook assembly that can be stored out of the way when not in use, but easily deployed for quick and handy use.

SUMMARY OF THE INVENTION

The present invention is a utility hook assembly that conveniently secures to a planar surface such as the bottom of a counter or cabinet, and has a plurality of hooks that extend perpendicular to a mounting base. The base includes holes that can be used to mount the base to the underside of a surface found in a kitchen, counter, shop, shed, studio, laundry room, office, or any location where space is limited. The base also includes on an outer surface a fixed bracket with a pair of eyelets that are collinear at an edge of the mounting bracket. The eyelets each receive one end of a suspended hook member such that the suspended hook members can swing/pivot about their respective eyelet in separate but parallel vertical planes. The opposite ends of the hook members are preferably collinear and laterally extended in opposite directions. Disposed on an inner surface of the base is one or more magnets positioned above the intersection of the opposite ends of the hook members and the base when the hook members are fully rotated parallel to the base. The magnets may be in a preferred embodiment Neodymium permanent magnets selected for their small size and strong magnetic field. The magnets allow the hooks to attach to the base without any other mechanical attachments, providing a simple and reliable attachment mode for the utility hooks.

These and other features of the invention will best be understood with reference to the drawings and the detailed description of the invention.

DETAILED DESCRIPTION OF THE PREFERRED EMBODIMENTS

Figure 1:
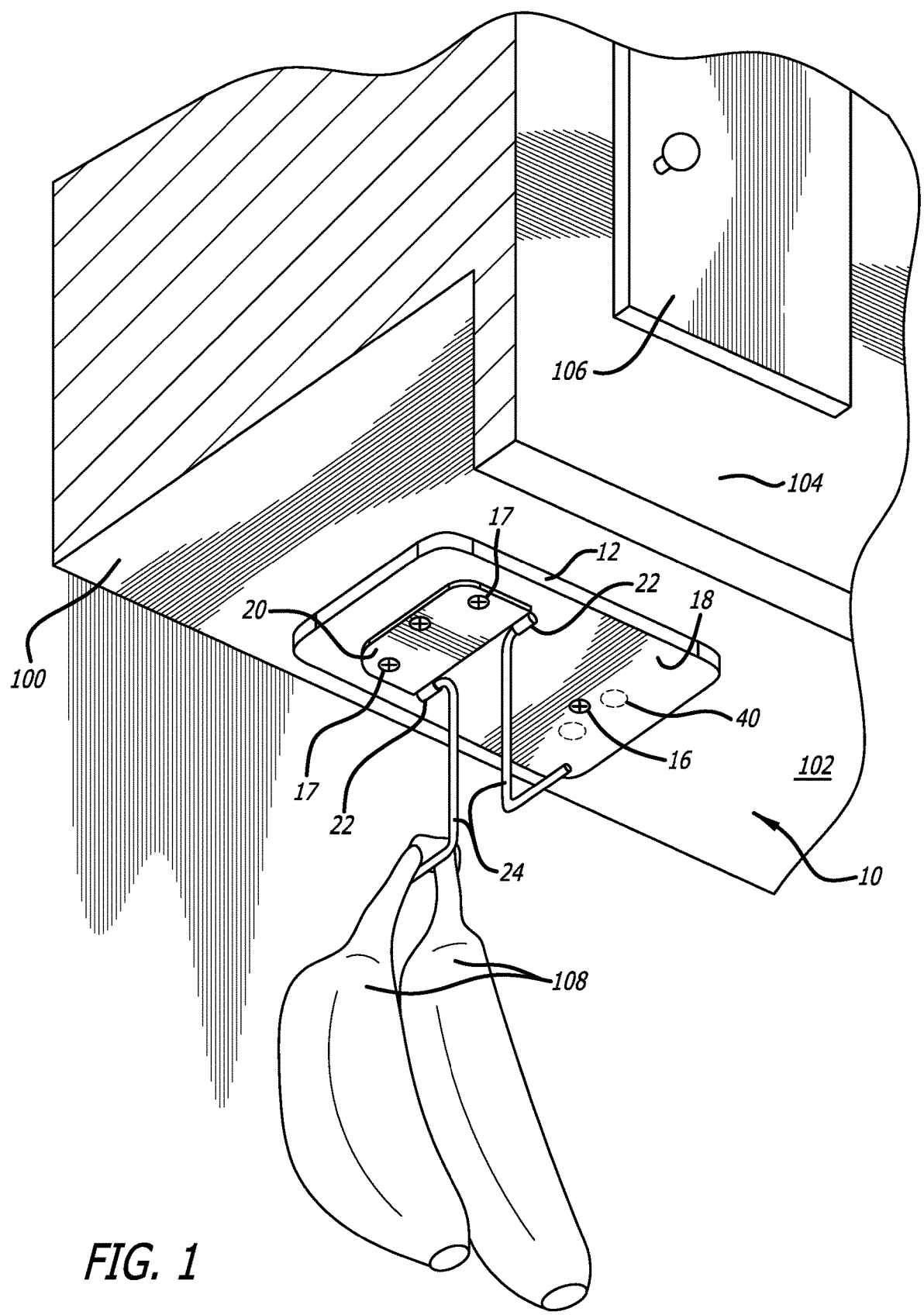
FIG. 1 is a perspective of a first embodiment of the invention.
Figure 2:
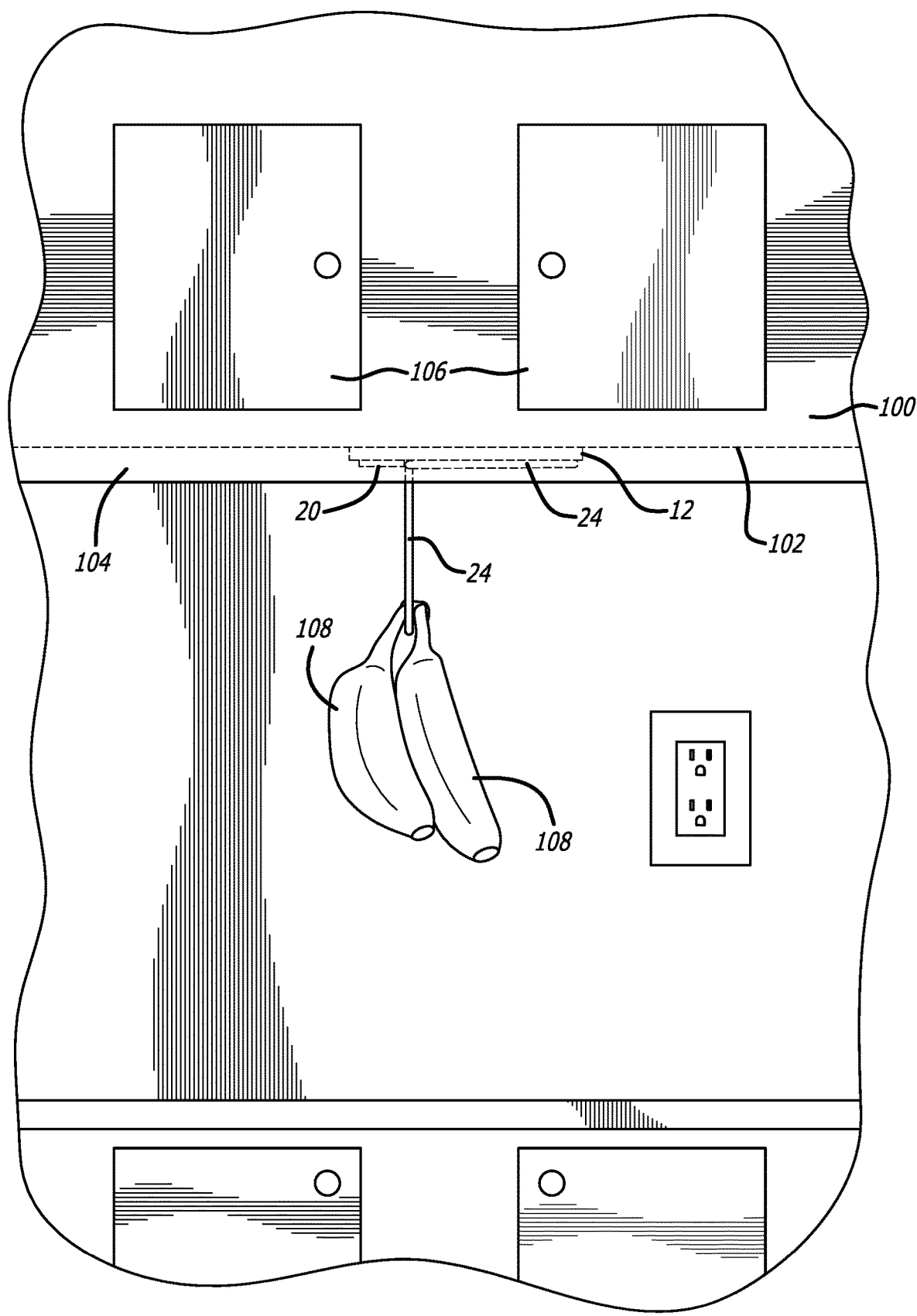
FIG. 2 is a side view, partially in phantom, of the embodiment of FIG. 1.
Figure 3:
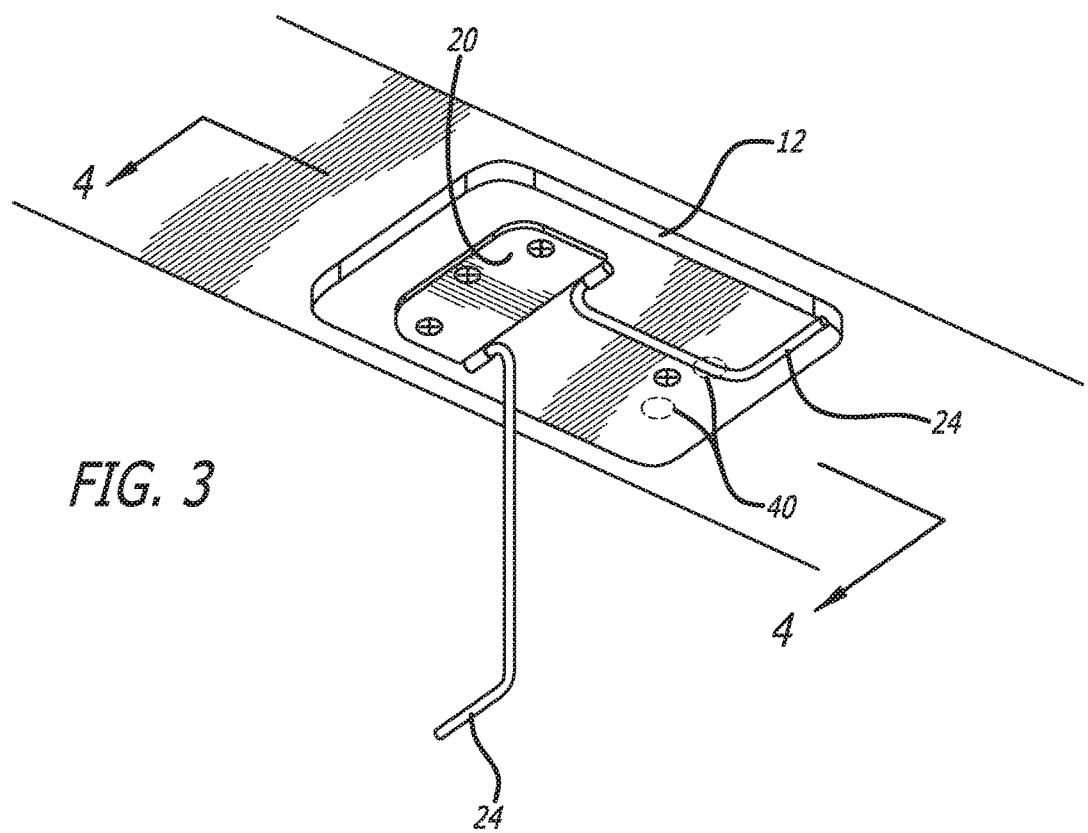
FIG. 3 is an enlarged, perspective view of the embodiment of FIG. 1.
Figure 4:
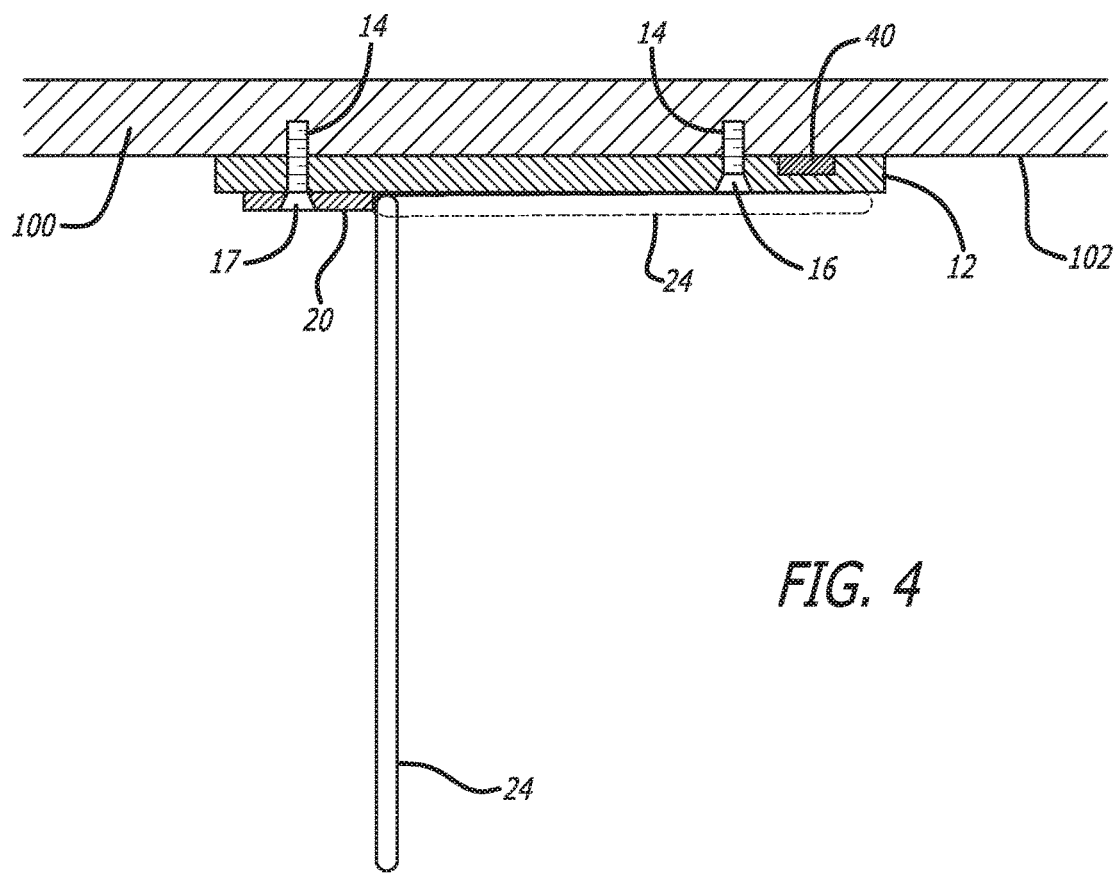
FIG. 4 is a cross sectional view of the embodiment of FIG. 1.
Figure 5:
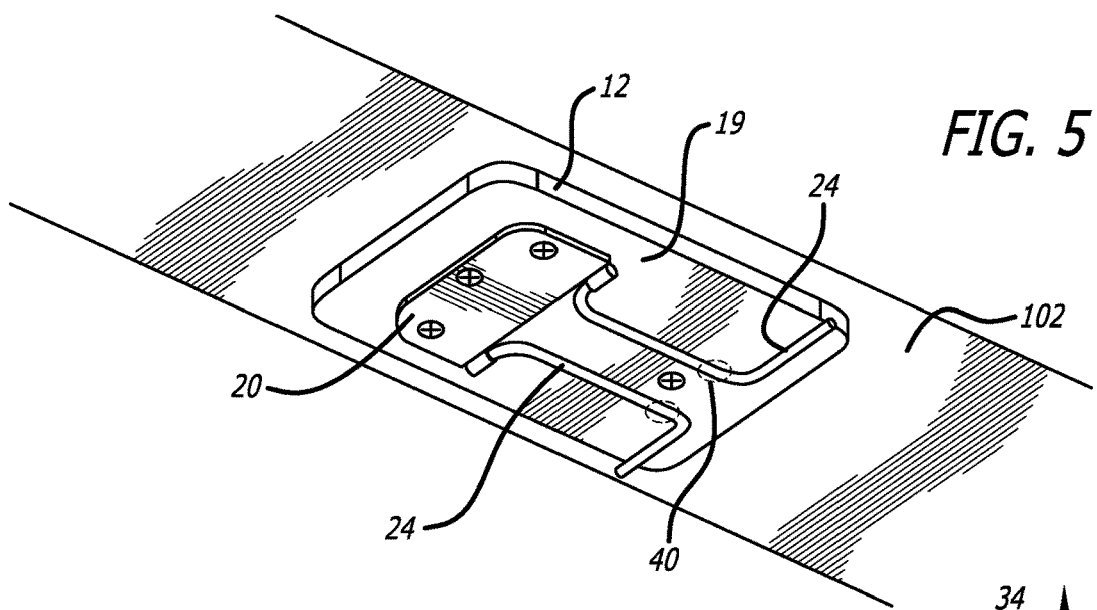
FIG. 5 is an enlarged, perspective view of the embodiment with both hooks stored.
Figure 6:
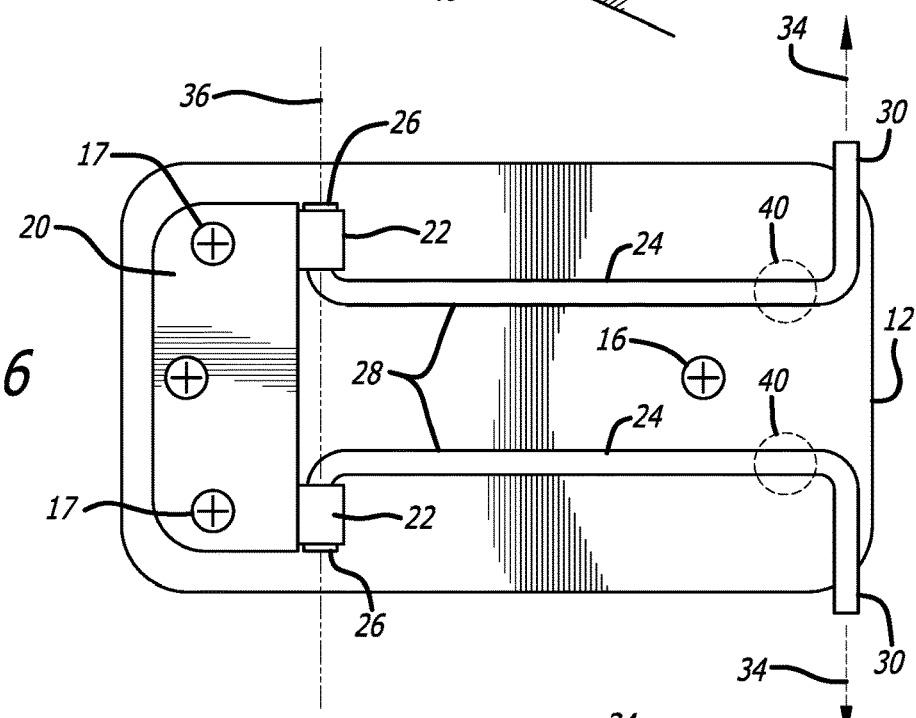
FIG. 6 is a bottom view of the embodiment of FIG. 1.
Figure 7:
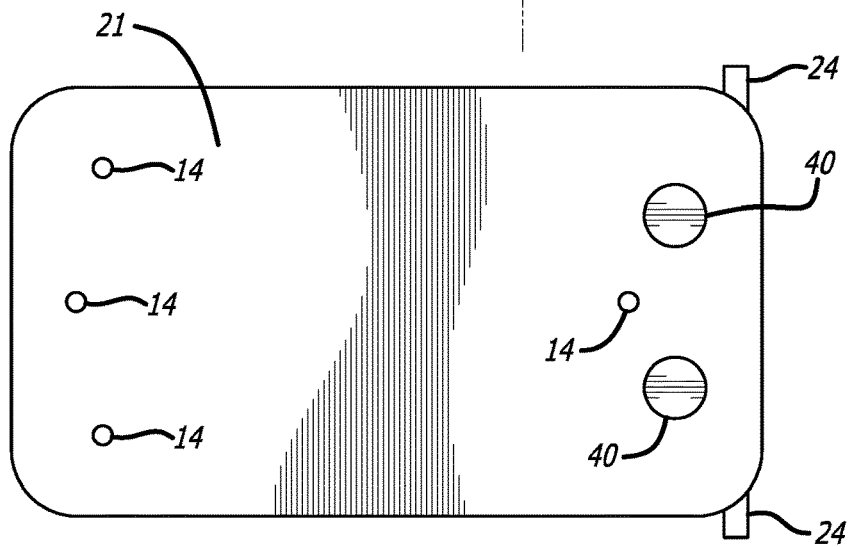
FIG. 7 is a top view of the embodiment of FIG. 1.

A first embodiment of the present invention is shown in FIGS. 1-7 in the environment of an underside of a kitchen cabinet 100. It is to be understood that the invention has many uses and many applications, and is not limited by the particular environment shown in the Figures. The kitchen cabinet 100 has an underside 102 below a front facing panel 104 and a cabinet door 106. Only a portion of the cabinet 100 is shown for clarity. The invention is shown hanging a pair of bananas 108, although they could easily be used for potholders, kitchen utensils, tools, headsets, items to dry, or a myriad of other items.

Mounted to the underside 102 of the cabinet 100 is a utility hook assembly, generally denoted 10. The assembly 10 includes a substantially rectangular plate 12 that includes fastener holes 14 and fasteners 16 for affixing the assembly 10 to the underside 102 of the cabinet 100. Substantially rectangular here includes shapes where the corners are rounded or squared off, although other shapes are available without departing from the scope of the invention. Secured to the rectangular plate 12 on its outer surface 18 is a mounting bracket 20 comprising a thin plate with holes that coincide with holes 14 in the rectangular plate 12. Fasteners 17 pass through both the mounting bracket 20 and the rectangular plate 12 to secure the assembly 10 to the cabinet 100. The mounting bracket 20 includes on a first edge a pair of spaced apart cylindrical eyelets 22 that are aligned so as to share a common longitudinal axis 36.

The assembly 10 further comprises a pair of hooks 24 that each include a proximal end 26, and intermediate portion 28, and a distal end 30. The proximal end 26 of each hook 24 is journaled in an eyelet 22 for rotation therein so that both hooks can rotate in a vertical plane. The intermediate portions 28 can be linear as shown in the figures, but do not have to include this shape. The distal ends 30 of the hooks 24 extend peripherally away from each other in a direction 34 that is parallel to the common longitudinal axis 36 of the eyelets 22.

Disposed on the surface 21 of the substantially rectangular plate 12 opposite the surface 19 that supports the mounting bracket 20 is a pair of magnets 40, where the magnets 40 can be adhesively applied to the surface 21, press fit into recess, or otherwise attached to the rectangular plate 12. The placement of the magnets 40 is preferably over the distal ends 30 of the hooks 24 when the hooks 24 are rotated against the surface 19 of the plate 12. The thickness of the plate 12 and the strength of the magnets 40 are selected so that the magnets can attract the hooks 24 through the plate 12 and latch the hooks to the surface 19 (see FIG. 5) when not in use. In another embodiment, a single magnet can be used that spans the width of the plate 12 and attracts both hooks 24. By positioning the magnets above the peripherally extending distal hook ends 30, smaller magnets are needed to secure the hooks; however, the magnets do not need to be placed directly over the distal ends 30 as long as the magnet(s) can attach the hooks to the plate lower surface 19. When not in use, the hooks 24 attach via the magnets 40 to the plate 12, and when needed the hooks are detached from the plate 12 and dangle vertically to allow items to be hung conveniently therefrom. To create hooks 24 of non-equal lengths, the intermediate portion of the hooks can be of non-equal lengths and the magnets 40 repositioned accordingly so that each magnet 40 is above the distal end 30 of one of the respective hooks 24. Using this design, either or both of the hooks 24 can be used simultaneously, and the hooks operate independent of each other. In one embodiment, the hooks can be removed from the eyelets 22, and in another embodiment the hooks are permanently fixed in the eyelets.

The present invention has been depicted and described with respect to the inventor's preferred embodiment, but the invention is not limited to those embodiments shown and described herein. A person of ordinary skill in the art will readily recognize that there are many variations, modifications, and substitutions that are possible with the present invention, and the scope of the invention is intended to include all such variations, modifications, and substitutions. For example, the hooks 24 may be individually mounted in a circle pattern or linear wherein the hooks are on a base accompanying many more hooks, such that the use of multiple bases can form a continuous row of hooks. Accordingly, unless expressly limited herein, the scope of the invention is properly measured by the words of the appended claims using their customary and ordinary meanings consistent with, but not limited to, the embodiments described and depicted above.

I claim:

1. A utility hook assembly, comprising:
   a base comprising a substantially rectangular plate including holes for receiving a fastener therein through;
   a mounting bracket secured to a bottom surface of the base, the mounting bracket including first and second spaced apart cylindrical eyelets sharing a common longitudinal axis;
   first and second hooks each mounted at its proximal end inside a respective one of the first and second spaced apart cylindrical eyelets for rotation therein, the first and second hooks each further comprising at a distal end peripherally extending hook ends each configured to be substantially parallel to the common longitudinal axis of the eyelets along an entire length of the hook end; and
   a magnet disposed on an upper surface of the base, the magnet positioned above the peripherally extending hook ends when the first and second hooks are rotated about their respective eyelets against the base;
   wherein the magnet on the upper surface of the base attaches the first and second hooks against the base when not in use, and wherein the first and second hooks dangle vertically from their respective eyelets when not attached to the base.

2. The utility hook assembly of claim 1, wherein the first and second hooks include an intermediate portion that extends vertically when not attached to the base.

3. The utility hook assembly of claim 2, wherein the intermediate portions of the first and second hooks are of non-equal lengths.

4. The utility hook assembly of claim 1, wherein the magnet is comprised of a first and second magnet tasked with attaching a selected one of the first and second hooks.

5. The utility hook assembly of claim 1, wherein the first and second hooks rotate independent of each other.

6. The utility hook assembly of claim 1, wherein the proximal ends of the first and second hooks are permanently fixed in their respective eyelets.

7. The utility hook assembly of claim 1, wherein the magnet is inset into the base and mounted flushly with the upper surface of the base.

* * * * *